(12) United States Patent
Dev et al.

(10) Patent No.: US 10,267,171 B2
(45) Date of Patent: Apr. 23, 2019

(54) SEAL ASSEMBLY FOR A TURBOMACHINE

(71) Applicant: GENERAL ELECTRIC COMPANY, Schenectady, NY (US)

(72) Inventors: Bodhayan Dev, Niskayuna, NY (US); Neelesh Nandkumar Sarawate, Schenectady, NY (US); Jason Edward Albert, Greenville, SC (US)

(73) Assignee: General Electric Company, Schenectady, NY (US)

( * ) Notice: Subject to any disclaimer, the term of this patent is extended or adjusted under 35 U.S.C. 154(b) by 516 days.

(21) Appl. No.: 14/962,979

(22) Filed: Dec. 8, 2015

(65) Prior Publication Data
US 2017/0159478 A1 Jun. 8, 2017

(51) Int. Cl.
| | |
|---|---|
| *F01D 11/00* | (2006.01) |
| *F01D 9/04* | (2006.01) |
| *F01D 5/02* | (2006.01) |
| *F01D 5/12* | (2006.01) |
| *F04D 29/08* | (2006.01) |
| *F16J 15/08* | (2006.01) |

(52) U.S. Cl.
CPC .............. *F01D 11/006* (2013.01); *F01D 5/02* (2013.01); *F01D 5/12* (2013.01); *F01D 9/041* (2013.01); *F04D 29/083* (2013.01); *F16J 15/0887* (2013.01); *F05D 2220/32* (2013.01)

(58) Field of Classification Search
CPC . F01D 11/006; F01D 5/02; F01D 5/12; F01D 9/041; F16J 15/0887; F05D 2220/32
See application file for complete search history.

(56) References Cited

U.S. PATENT DOCUMENTS

| | | | |
|---|---|---|---|
| 4,484,858 A | 11/1984 | Kurosawa et al. | |
| 5,088,888 A | 2/1992 | Bobo | |
| 5,154,577 A | 10/1992 | Kellock et al. | |
| 5,868,398 A | 2/1999 | Maier et al. | |
| 6,932,567 B2 | 8/2005 | Albers et al. | |
| 7,497,443 B1 | 3/2009 | Steinetz et al. | |
| 8,075,255 B2 | 12/2011 | Morgan | |
| 8,613,451 B2 | 12/2013 | Samudrala et al. | |
| 8,690,158 B2 | 4/2014 | Beeck | |
| 8,794,640 B2 | 8/2014 | Bergman et al. | |
| 9,771,819 B2* | 9/2017 | Morgan | F01D 25/24 |
| 9,869,194 B2* | 1/2018 | Dev | F01D 11/005 |
| 2012/0007318 A1 | 1/2012 | Lee et al. | |
| 2014/0348642 A1* | 11/2014 | Weber | F01D 11/005 415/170.1 |

OTHER PUBLICATIONS

Nakane, H., et al.; "The Development of High Performance Leaf Seals", ASME Turbo Expo 2002: Power for Land, Sea, and Air, vol. 3: Turbo Expo 2002, Jun. 3-6, 2002, Amsterdam, The Netherlands.

(Continued)

*Primary Examiner* — Gilbert Y Lee
(74) *Attorney, Agent, or Firm* — GE Global Patent Operation; John Darling

(57) ABSTRACT

The present disclosure relates to a turbomachine that includes a first component and a second component coupled to another and a seal assembly disposed between the two components. The seal assembly may include an upstream corner shim, a downstream corner shim, and/or one or more intersegment seals that are configured to block a flow of fluid between the two components.

20 Claims, 5 Drawing Sheets

(56) References Cited

OTHER PUBLICATIONS

Aksit, Mahmut, et al.; "Parasitic corner leakage reduction in gas turbine nozzle-shroud inter-segment locations", Joint Propulsion Conferences, 37th Joint Propulsion Conference and Exhibit, American Institute of Aeronautics and Astronautics.

Steinetz, Bruce M. et al.; "High Temperature Braided Rope Seals for Static Sealing Applications", NASA Technical Memorandum 107233 Revised Copy, Jul. 1-3, 1996, pp. 1-14, http://ntrs.nasa.gov/archive/nasa/casi.ntrs.nasa.gov/19960038390.pdf.

\* cited by examiner

SEAL ASSEMBLY FOR A TURBOMACHINE

BACKGROUND

The subject matter disclosed herein relates to turbomachines, and more specifically to a sealing assembly between portions of a turbomachine component.

A variety of turbomachines, such as turbines and compressors, may include seals disposed between segments. For example, a gas turbine may include stationary portions (e.g., stators) arranged circumferentially about a rotor. Unfortunately, the segments may experience thermal expansion and contraction, vibration, bending, and other forces, which can reduce the effectiveness of traditional seals. Furthermore, traditional seals between stationary portions may experience substantial pressure differences between different fluid flows, such as a hot gas flow driving the turbine blades and a coolant air flow for cooling the segments. As a result, traditional seals may experience leakage, which can reduce performance and reliability of the turbomachine (e.g., gas turbine). Accordingly, it is now recognized that an enhanced seal is desired.

BRIEF DESCRIPTION

In one embodiment, a turbomachine includes a first component that has a first seal slot with a first corner, a second component coupled to the first component, where the second component has a second seal slot with a second corner. The turbomachine also includes a gap between the first component and the second component and a seal assembly disposed in the first seal slot, the second seal slot, and the gap. The seal assembly includes a first corner shim and a second corner shim, where the first corner shim and the second corner shim are both configured to fit in the first corner and the second corner. The seal assembly is configured to substantially block a fluid from flowing through the gap and through one or both of the first corner and the second corner.

In another embodiment, a power generation system includes a turbomachine, a first component of the turbomachine that has a first seal slot, where the first seal slot includes a first segment and a second segment coupled to one another by a first corner, and a second component of the turbomachine coupled to the first component. The second component includes a second seal slot that has a third segment and a fourth segment coupled to one another by a second corner. The power generation system further includes a gap between the first component and the second component and a seal assembly disposed in the first seal slot, the second seal slot, and the gap. The seal assembly includes a first corner shim configured to be disposed in the first segment, the second segment, the third segment, and the fourth segment, a second corner shim configured to be disposed in the first segment, the second segment, the third segment, and the fourth segment, a first intersegment seal disposed between the first corner shim and the second corner shim and configured to be disposed in the first segment and the third segment, and a second intersegment seal disposed between the first corner shim and the second corner shim and configured to be disposed in the second segment and the fourth segment. The seal assembly is configured to substantially block a fluid from flowing through the gap and through one or both of the first corner and the second corner.

In another embodiment, a method includes disposing a first portion of a seal assembly in a first seal slot of a first component of a turbomachine, where the seal assembly includes a first corner shim, a second corner shim, a first intersegment seal and a second intersegment seal, disposing a second portion of the seal assembly in a second seal slot of a second component of the turbomachine, and coupling the first component to the second component to form a gap between the first component and the second component, where the seal assembly is configured to substantially block a fluid from flowing through the gap during operation of the turbomachine.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
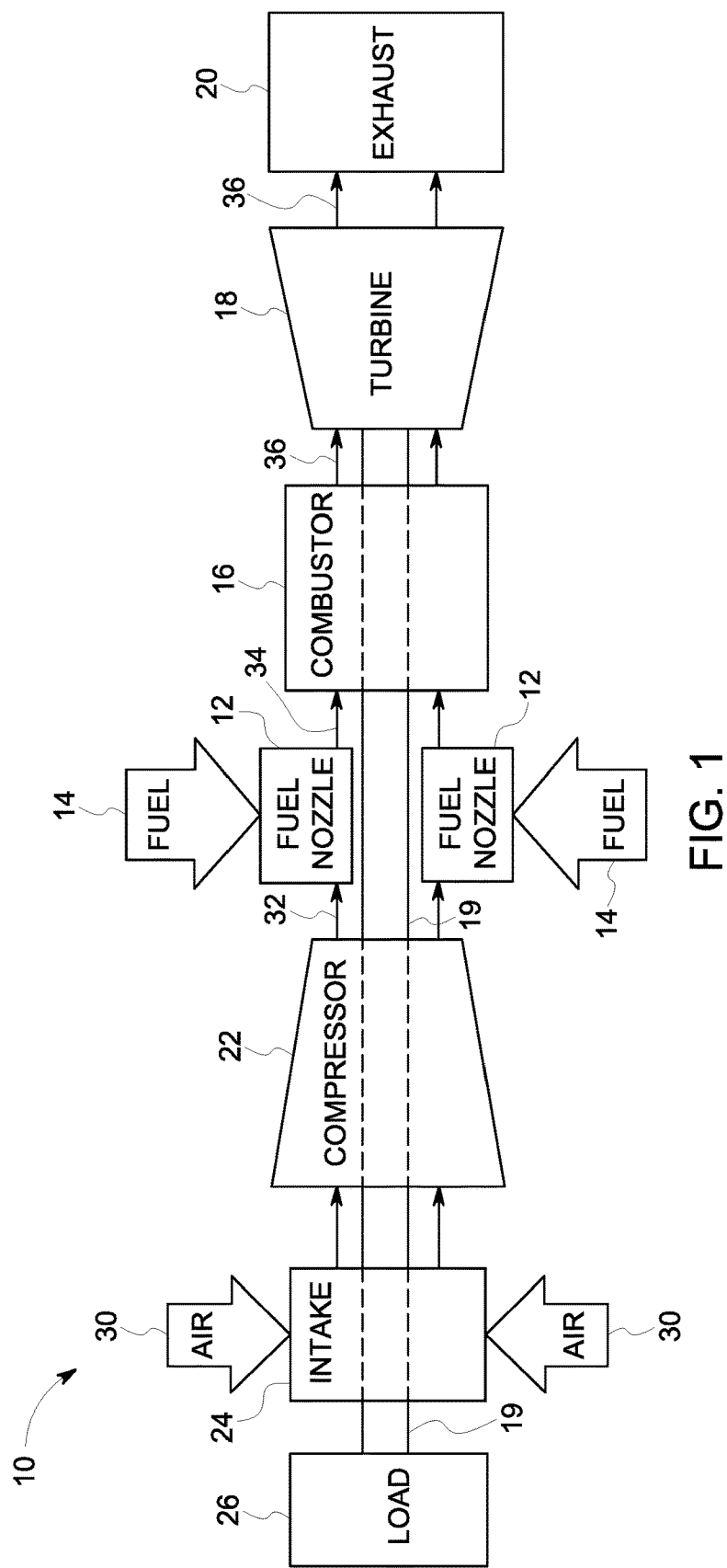
FIG. 1 is a block diagram of an embodiment of a gas turbine system, in accordance with an aspect of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Power generation systems may include turbomachines (e.g., compressors and/or turbines) that may be utilized to ultimately power a load (e.g., a power plant). Turbomachines include elements that may move (e.g., rotate) or remain substantially stationary with respect to a shaft utilized to drive the load. For example, a turbomachine may include rotors (e.g., components that rotate about the shaft) and stators (e.g., components that remain substantially stationary with respect to the shaft). In some cases, the turbomachine may be formed from multiple components that are coupled to one another. However, coupling the components together may form one or more gaps between components, which may enable fluid (e.g., gas) to flow through the components. It may be undesirable for fluid to flow between the components because it may reduce an efficiency of the turbomachine. For example, hot combustion gases may contact a first side of a component and a cooling fluid may contact a second side of the component. The flow of combustion gases may be configured to spin the rotor and/or the shaft, which may power the load. However, the combustion gases may also increase a temperature of the component via the contact with the first side. Accordingly, the cooling fluid may contact the second side of the component to maintain the temperature of the component at a desired level during operation (e.g., when exposed to hot combustion gases). Mixing the cooling fluid and the hot combustion gases with one another may reduce a cooling efficiency of the turbomachine because the temperature of the cooling fluid may be increased, thereby leading to an increased temperature of the turbomachine component.

To separate the cooling fluid and the hot combustion gases, traditional turbomachines include seals between the components to fill the gap. Therefore, each individual component may include a seal slot configured to receive the seal. However, manufacturing tolerances may cause the seal disposed in the seal slots to leave openings that still provide a path for the cooling fluid and/or the hot combustion gases to flow between two components. Therefore, it is now recognized that an enhanced seal assembly is desired to reduce leakage of the cooling fluid and/or the hot combustion gases between the components. In accordance with embodiments of the present disclosure, the seal assembly may include an upstream corner shim (e.g., a first corner shim), a downstream corner shim (e.g., a second corner shim), and/or one or more intersegment seals (e.g., a laminate seal, a cloth seal, dogbones, solid seals, a shim, and/or another sealing device). Such a seal assembly may block a flow of the cooling fluid and/or the hot combustion gases through corners and/or edges of the seal slots, thereby reducing leakage and enhancing an efficiency of the turbomachine.

Turning now to the drawings and referring first to FIG. 1, a block diagram of an embodiment of a gas turbine system 10 is illustrated. The diagram includes a fuel nozzle 12, fuel 14, and a combustor 16. As depicted, the fuel 14 (e.g., a liquid fuel and/or gas fuel, such as natural gas) is routed to the turbine system 10 through the fuel nozzle 12 into the combustor 16. The combustor 16 may ignite and combust an air-fuel mixture 34, and then pass hot pressurized exhaust gas 36 into a turbine 18. The exhaust gas 36 passes through turbine blades of a turbine rotor in the turbine 18, thereby driving the turbine 18 to rotate. In accordance with present embodiments, a seal assembly that includes an upstream corner shim and a downstream corner shim may be disposed within seal slots between rotor and/or stator segments within the turbine 18 to block hot exhaust gases 36 flowing through the turbine from mixing with a cooling fluid. The coupling between blades in the turbine 18 and a shaft 19 will cause the rotation of the shaft 19, which is also coupled to several components (e.g., a compressor 22, a load 26) throughout the turbine system 10. Eventually, the exhaust gases 36 of the combustion process may exit the turbine system 10 via an exhaust outlet 20.

In an embodiment of the turbine system 10, compressor vanes or blades are included in the compressor 22. Blades within the compressor 22 may be coupled to the shaft 19, and will rotate as the shaft 19 is driven to rotate by the turbine 18. The compressor 22 may intake air 30 into the turbine system 10 via an air intake 24. Further, the shaft 19 may be coupled to the load 26, which may be powered via rotation of the shaft 19. As appreciated, the load 26 may be any suitable device that may generate power via the rotational output of the turbine system 10, such as a power generation plant or an external mechanical load. For example, the load 26 may include an electrical generator, a propeller of an airplane, and so forth. The air intake 24 draws the air 30 into the turbine system 10 via a suitable mechanism, such as a cold air intake, for subsequent mixture of the air 30 with the fuel 14 via the fuel nozzle 12. The air 30 taken in by the turbine system 10 may be fed and compressed into pressurized air 32 by rotating blades within the compressor 22. The pressurized air 32 may then be fed into one or more of the fuel nozzles 12. The fuel nozzles 12 may then mix the pressurized air 32 and the fuel 14, to produce the air-fuel mixture 34 that is suitable for combustion (e.g., a combustion that causes the fuel 14 to more completely burn to minimize an amount of wasted fuel 14 and/or emissions in the exhaust gases 36). As discussed above, the turbine 18 is driven by the exhaust gases 36, and such exhaust gases may contact a first side of components of the turbine (e.g., the rotor and/or the stator). Accordingly, such segments may include a seal assembly that has one or more corner shims configured to block leakage between segments of the turbine components.

Figure 2:
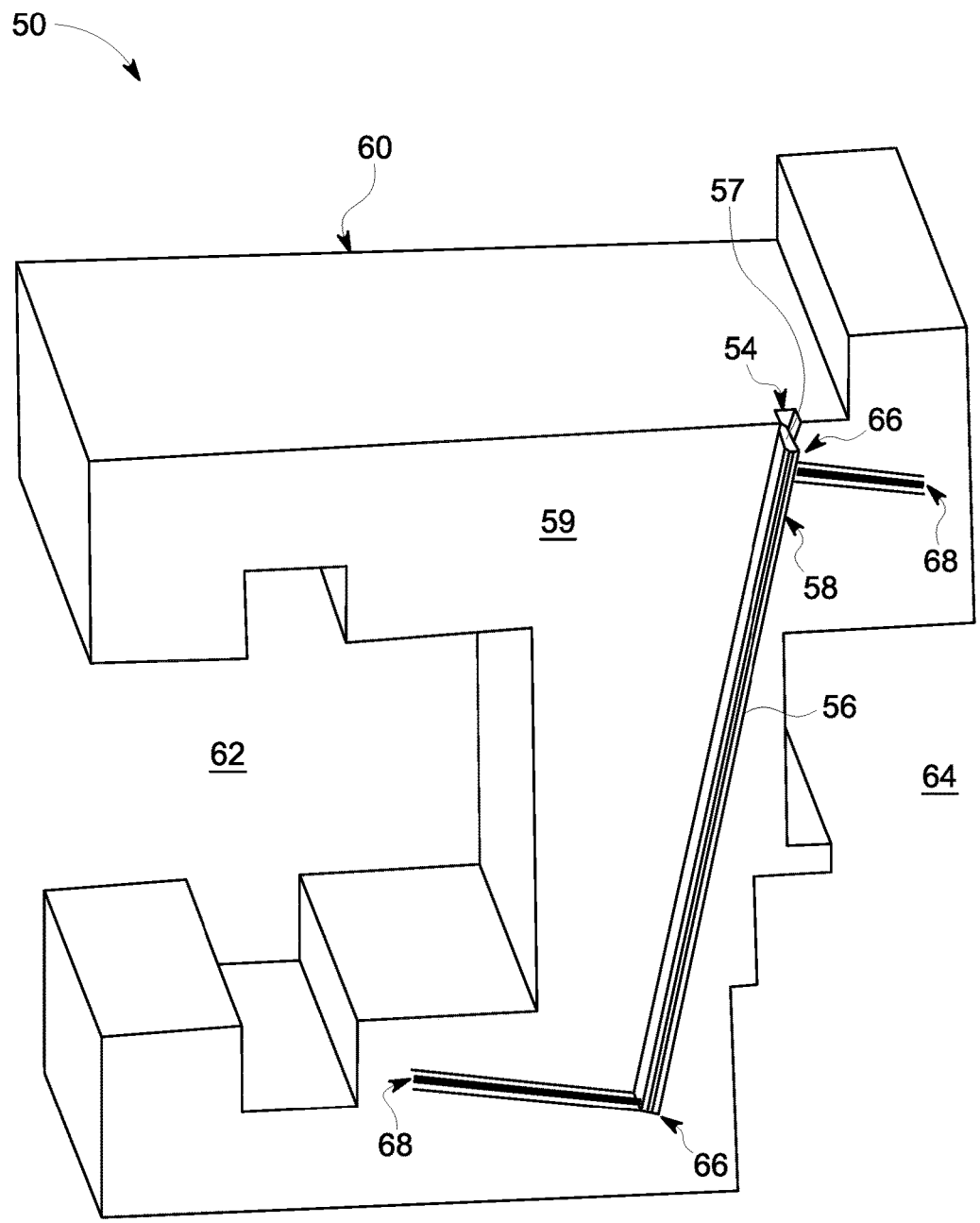
FIG. 2 is a perspective view of a component of the turbine system of FIG. 1 that includes a seal assembly disposed in a seal slot, in accordance with an aspect of the present disclosure.

FIG. 2 is a perspective view of a component 50 (e.g., a stator portion or a rotor portion) of the turbine 18 and/or the compressor 22 that includes a seal slot 54. In accordance with embodiments of the present disclosure, a seal assembly 56 (e.g., one or more corner shims and/or one or more intersegment seals) may be disposed in the seal slot 54 to block fluid flow between two components 50 coupled to one another. For example, a plurality of the components 50 may be coupled to one another to form a circular or cylindrical stator around the shaft 19, for example. Accordingly, a first portion 57 of the seal assembly 56 may be disposed in the seal slot 54 of the component 50 and a second portion 58 of the seal assembly 56 may be disposed in a seal slot of a second component. It should be noted that the turbine 18 and/or the compressor 22 may include multiple components 50 that each include one or more seal slots 54 and seal assemblies 56 (e.g., each component 50 may include a seal slot 54 on a first face 59 and a second face 60).

However, in some cases, a gap and/or opening may form when the component 50 is coupled to a second component, thereby enabling fluid (e.g., hot combustion gases and/or a cooling fluid) to flow from a first side 62 of the component 50 to a second side 64 of the component 50. To block the fluid from flowing between the first side 62 and the second side 64, the first portion 57 of the seal assembly 56 may be disposed in the seal slot 54 of the component 50 and the second portion 58 of the seal assembly 56 may be disposed in a second seal slot of the second component (e.g., see FIG. 3). Additionally, as shown in the illustrated embodiment of FIG. 2, the seal slot 54 may include one or more corners 66 to enhance the seal between the component 50 and the second component. However, existing seal assemblies may leave gaps at the corners 66 of the seal slots 54 and/or at ends 68 of the seal slot 54. Accordingly, it is now recognized that an enhanced seal assembly 56 may minimize any leakage of fluid through the corners 66 and/or the ends 68 of the seal slot 54. Minimizing leakage of the fluid between the first side 62 and the second side 64 may enhance an efficiency of the turbine system 10 (e.g., by increasing a cooling capacity of the cooling fluid). The details of the sealing assemblies 56 are further described below with reference to FIGS. 3 and 4.

Figure 3:
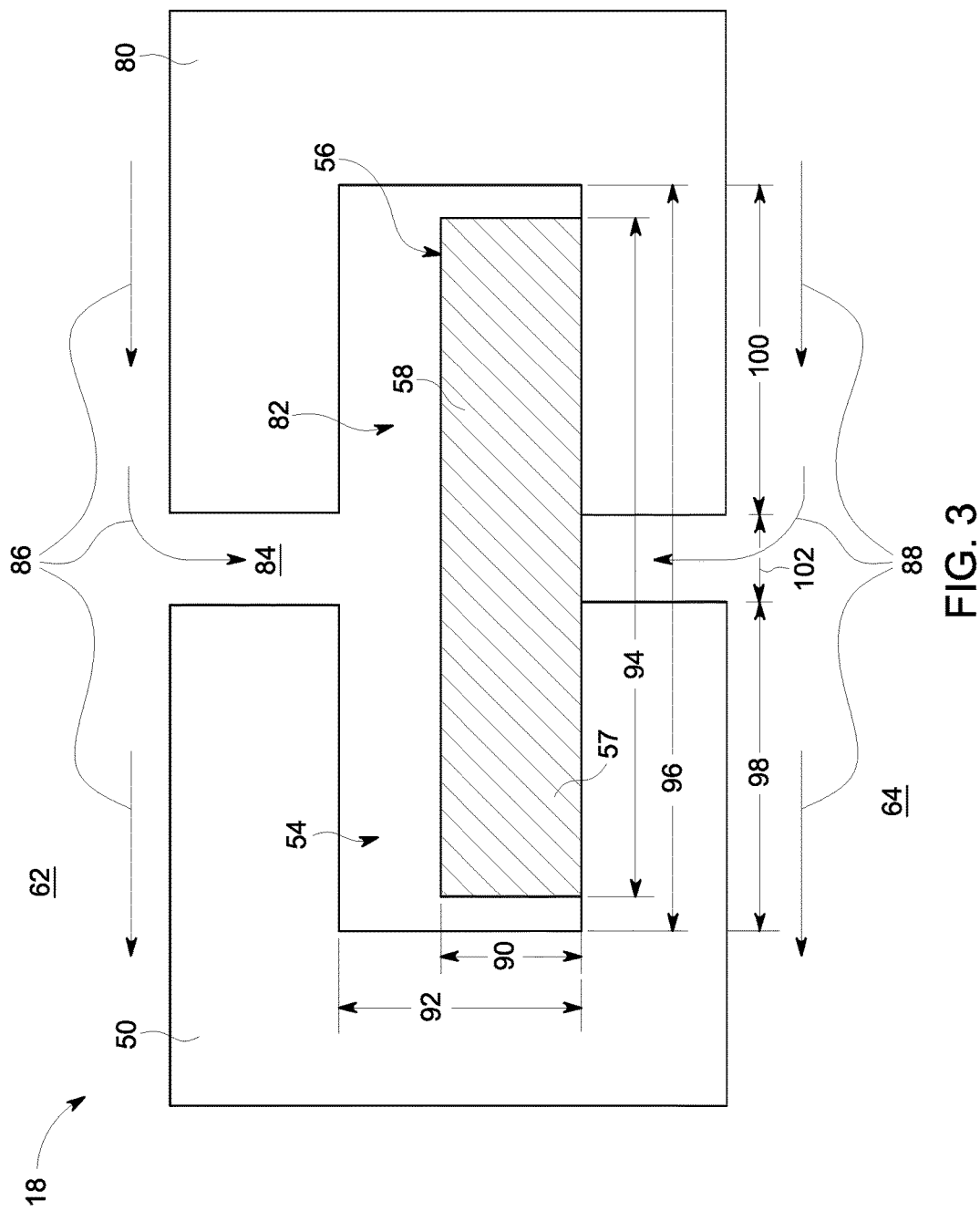
FIG. 3 is a cross-section of a portion of the turbine of the turbine system of FIG. 1 that includes a seal assembly disposed between the component of FIG. 2 and an additional component coupled to the component, in accordance with an aspect of the present disclosure.

For example, FIG. 3 shows a cross-section of a portion of the turbine 18 and/or the compressor 22 that includes the component 50 (e.g., the first component) and a second component 80 coupled to one another (e.g., via a coupling device not shown). Additionally, the first portion 57 of the seal assembly 56 is disposed in the seal slot 54 (e.g., the first seal slot) of the first component 50 and the second portion 58 of the seal assembly 56 is disposed in a second seal slot 82 of the second component 80. In some embodiments, the first and second components 50, 80 may include a first nozzle of a first stator and a second nozzle of a second stator, respectively. However, it should be noted that in other embodiments, the first and second components 50, 80 may be any adjacent components of the turbine 18 and/or the compressor 22. Accordingly, the seal assemblies described herein may be configured for, or used with, any number or type of components of the turbine 18 and/or the compressor 22 that may be sealed to reduce leakage between the components.

As shown in the illustrated embodiment of FIG. 3, the first and second components 50, 80 may be spaced from one another such that a gap 84 extends between the first and second components 50, 80. Accordingly, the gap 84 may enable the fluid (e.g., combustion gases and/or cooling fluid) to flow between the first and second components 50, 80 (and from the first side 62 to the second side 64). In some configurations, the first and second components 50, 80 may be positioned between a first flow path 86 (e.g., a flow of hot combustion gases contacting the first side 62) and a second flow path 88 (e.g., a flow of cooling air contacting the second side 64). To block the first flow path 86 from mixing with the second flow path 88, the sealing assembly 56 may be disposed in the first seal slot 54 and in the second seal slot 82. The first and second seal slots 54, 82 may have any size, shape, or configuration capable of receiving the seal assembly 56. For example, as shown in the embodiment of FIG. 3, the first and second seal slots 54, 82 may be substantially similar to one another and adjacent to one another.

In some cases, manufacturing and assembly limitations and/or variations, as well as thermal expansion and/or movement during operation, may cause the first and second seal slots 54, 82 to be offset, skewed, twisted, angled or otherwise misaligned. For example, the first and second seal slots 54, 82 may include a substantially similar shape, but the relative positioning of the first and second seal slots 54, 82 may change as a result of use, wear or operating conditions. As used herein, the term "misaligned" may include configurations where the first and second seal slots 54, 82 are intentionally offset as well as configurations where an alignment of the first and second seal slots 54, 82 has changed due to operating conditions of the turbine system 10, for example. In embodiments where the seal slots 54, 82 are offset or are likely to become offset (e.g., when the turbine system 10 operates at high temperatures), the seal assembly 56 may include a flexible material such that the seal assembly 56 may be manipulated to fit in both the first seal slot 54 and the second seal slot 82, offset from the first seal slot 54.

As shown in the illustrated embodiment of FIG. 3, a thickness 90 of the seal assembly 56 may be less than a thickness 92 of the first seal slot 54 and/or the second seal slot 82. In some embodiments, the thickness 90 of the seal assembly 56 may be between 25 mm and 150 mm, between 50 mm and 130 mm, or between 60 mm and 120 mm. Additionally, the seal assembly 56 may include a width 94 less than a width 96, where the width 96 is the sum of a first width 98 of the first seal slot 56, a second width 100 of the second seal slot 82, and a third width 102 of the gap 84.

As discussed above with reference to FIG. 2, the first seal slot 54 and/or the second seal slot 82 may not be a simple straight groove that lies within a single plane. For example, the first seal slot 54 and/or the second seal slot 82 may include one or more of the corners 66 to provide an enhanced seal. However, traditional seals may enable leakage between the components 50, 80 through the corners 66 and/or through end gaps of the seal slots 54, 82. Accordingly, enhanced configurations of the seal assembly 56 may be utilized to minimize leakage between the first component 50 and the second component 80.

Figure 4:
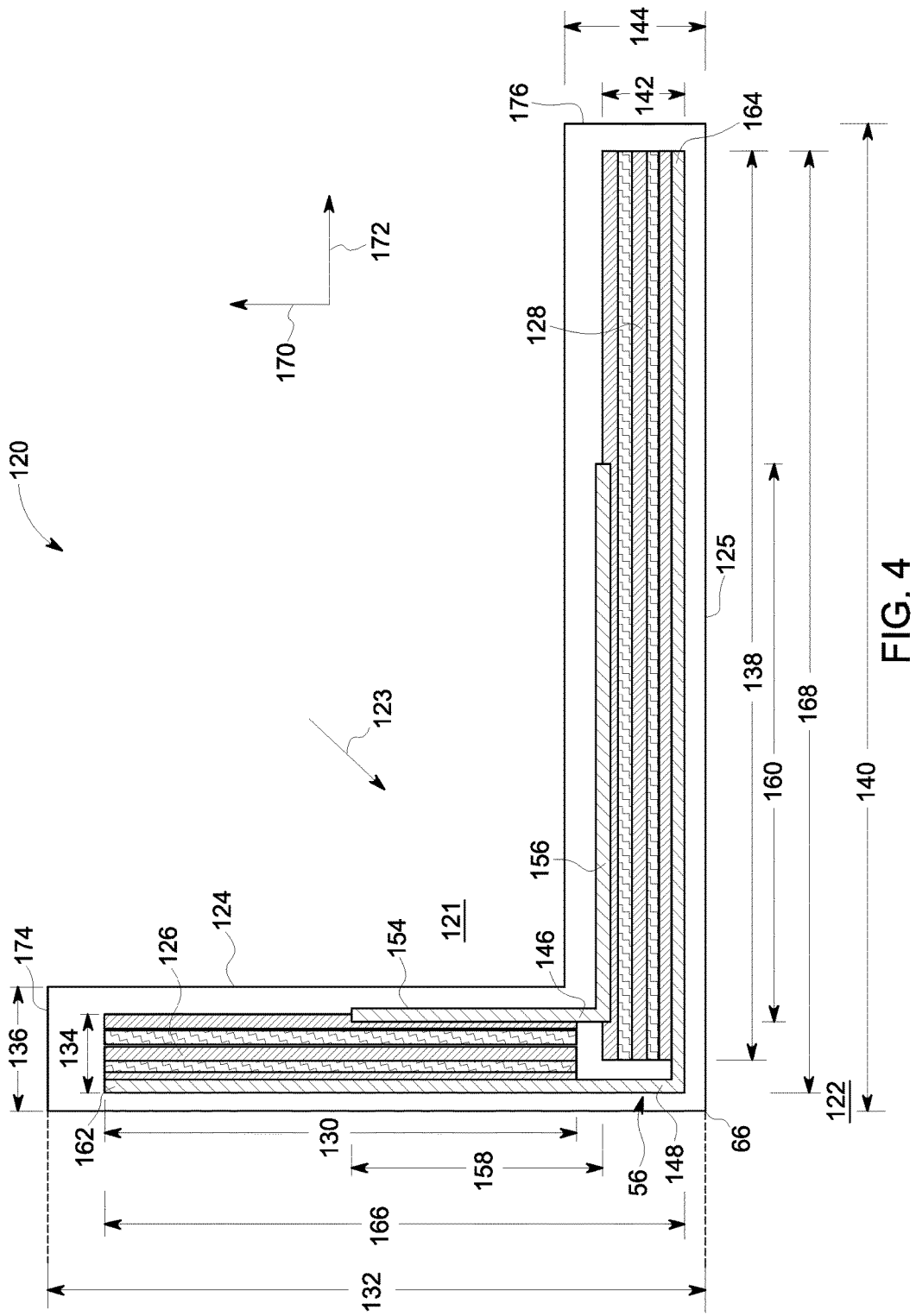
FIG. 4 is a block diagram illustrating an embodiment of the seal assembly of FIGS. 2 and 3 disposed in a seal slot having an "L" shape, in accordance with an aspect of the present disclosure.

For example, FIG. 4 is a block diagram illustrating an embodiment of the seal assembly 56 configured to be disposed in a seal slot 120 having an "L" shape (e.g., a first segment and a second segment joined by a corner). While the illustrated embodiment of FIG. 4 shows the seal slot 120 having the "L" shape, it should be noted that embodiments of the presently disclosed seal assembly 56 may be configured for any suitable configuration of seal slot. Accordingly, the seal slot 120 includes the corner 66. The seal slot 120 may separate an upstream portion 121 (e.g., the first side 62) and a downstream portion 122 (e.g., the second side 64) of the first component 50. Accordingly, the upstream portion 121 may include a higher pressure than the downstream portion 122, such that fluid may flow from the upstream portion 121 toward the downstream portion 122 in a direction 123. In traditional seal assemblies, the corner 66 may facilitate leakage between the first component 50 and the second component 80 because traditional sealing devices (e.g., laminates and/or shims) are substantially planar, and thus not able to fully conform to and seal the corner 66. Further, a conjoined seal (e.g., two or more laminate seals connected to one another) may still incur a relatively large amount of leakage at ends of the seal slot because of manufacturing and assembly tolerances (e.g., the conjoined seal has a length less than the seal slot so that it may fit within the seal slot).

As shown in the illustrated embodiment of FIG. 4, the "L" shaped seal slot 120 includes a vertical segment 124 (e.g., a first segment) and a horizontal segment 125 (e.g., a second segment). In certain embodiments, a first intersegment seal 126 (e.g., a laminate seal, a cloth seal, dogbones, solid seals, a shim, and/or another sealing device) may be disposed in the vertical segment 124 and a second intersegment seal 128 (e.g., a laminate seal, a cloth seal, dogbones, solid seals, a shim, and/or another sealing device) may be disposed in the horizontal segment 125. As used herein, an intersegment seal may include a sealing device that such as a laminate seal that includes multiple layers, a cloth seal, a dogbone seal, a solid seals, a shim, and/or another sealing device that includes a material configured to withstand the operating conditions of the turbine 18 as well as block the fluid from flowing through the seal slot 120. It should be noted that the first intersegment seal 126 and the second intersegment seal 128 are separate from one another (e.g., they are not conjoined or fixedly attached to one another).

As discussed above, the first and second intersegment seals 126, 128 may include lengths and thicknesses that are less than the lengths and thicknesses of the vertical segment 124 and the horizontal segment 125, respectively, to conform to manufacturing and assembly tolerances. For example, the first intersegment seal 126 may include a first length 130 that may be less than a length 132 of the vertical segment 124 and a first thickness 134 that may be less than a thickness 136 of the vertical segment 124. Accordingly, the first intersegment seal 126 may fit within the vertical segment 124 of the seal slot 120. Similarly, the second intersegment seal 128 may include a second length 138 that may be less than a length 140 of the horizontal segment 125 and a second thickness 142 that may be less than a thickness 144 of the horizontal segment 125. Accordingly, the second intersegment seal 128 may fit within the horizontal segment 125 of the seal slot 120. Utilizing the first intersegment seal 126 and the second intersegment seal 128 that include dimensions less than those of the seal slot 120 may facilitate assembly of the turbomachine system 10.

Additionally, the illustrated embodiment of FIG. 4 shows the seal assembly 56 including an upstream corner shim 146 (e.g., a first corner shim) and a downstream corner shim 148 (e.g., a second corner shim) that may be disposed in the corner 66 of the seal slot 120. As used herein, a "corner shim" may include a sealing device that may include two or more members (e.g., planar pieces of material) connected by one or more corners (e.g., a joint between two members). In some embodiments, the upstream corner shim 146 and/or the downstream corner shim 148 may include a high temperature alloy material such as nickel-based alloys, titanium-based alloys, and/or cobalt-based alloys. Additionally, the upstream corner shim 146 and/or the downstream corner shim 148 may include a thickness of between 1 millimeter (mm) and 20 mm, 2 mm and 15 mm, or 8 mm and 12 mm.

In certain embodiments, the upstream corner shim 146 may be disposed proximate to the upstream portion 121 (e.g., with respect to the fluid flowing between the components 50, 80) of the seal slot 120 and the downstream corner shim 148 may be disposed proximate to the downstream portion 122 (e.g., with respect to the fluid flowing between the components 50, 80) of the seal slot 120. In certain embodiments, the upstream corner shim 146 may include a vertical portion 154 and a horizontal portion 156. In certain embodiments, the vertical portion 154 may include a length 158 less than the first length 132 and the horizontal portion 156 may include a length 160 less than the second length 140 to account for the first thickness 134 and the second thickness 142 of the first and second intersegment seals 126, 128 (e.g., the upstream corner shim 126 may not fit within the seal slot 120 when the vertical portion 154 includes the first length 130 and the horizontal portion 156 includes the second length 138). In other embodiments, the length 158 may be greater than or equal to the first length 132 and/or the length 160 may be greater than or equal to the second length 140. Additionally, the downstream corner shim 148 may also include a vertical portion 162 and a horizontal portion 164. In some embodiments, the vertical portion 162 may include a length 166 less than or equal to the first length 130 and/or the horizontal portion 164 may include a length 168 less than or equal the second length 138. In other embodiments, the length 166 may be greater than the first length 132 and/or the length 168 may be greater than the second length 140.

In accordance with embodiments of the present disclosure, the first intersegment seal 126 and the second intersegment seal 128 may not be coupled to (e.g., adhered to) the upstream corner shim 146 or the downstream corner shim 148. Accordingly, the first intersegment seal 126 may move along a vertical axis 170 and the second intersegment seal 128 may move along a horizontal axis 172 as operating conditions of the turbine system 10 fluctuate. It may be desirable for the first intersegment seal 126 to move along the vertical axis 170 because the first intersegment seal 126 may move toward a first end 174, thereby blocking the fluid from passing through the seal slot 120 via the first end 174. Further, even though the first intersegment seal 126 moves toward the first end 174, and thus away from the corner 66, the corner 66 remains sealed by the upstream corner shim 146 and/or the downstream corner shim 148. Similarly, it may be desirable for the second intersegment seal 128 to move along the horizontal axis 172 because the second intersegment seal 128 may move toward a second end 176, thereby blocking the fluid from passing through the seal slot 120 via the second end 176. Thus, even though the second intersegment seal 128 moves toward the second end 176, and thus away from the corner 66, the corner 66 remains sealed by the upstream corner shim 146 and/or the downstream corner shim 148.

Therefore, disposing the first intersegment seal 126, the second intersegment seal 128, the upstream corner shim 146, and the downstream corner shim 148 into the seal slot 120 may decrease an amount of leakage through the seal slot 120 because the upstream corner shim 146 and/or the downstream corner shim 148 may block the fluid from passing through the corner 66, while the first intersegment seal 126 and the second intersegment seal 128 may block the fluid from passing through the first end 174 and the second end 176, respectively.

In other embodiments, the seal assembly 56 may include the upstream corner shim 146 and the downstream corner shim 148, but not the first intersegment seal 126 and the second intersegment seal 128. Accordingly, the lengths 158, 160, 166, and/or 168 of the shims 146, 148 may be increased to account for the absence of the first intersegment seal 126 and the second intersegment seal 128. For example, the lengths 158, 160, 166, and/or 168 may be increased such that the upstream corner shim 146 and the downstream corner shim 148 are as close to the vertical end 174 and the horizontal end 176 as assembly and/or manufacturing tolerances will allow. Accordingly, leakage through the corner 66 is still blocked by the upstream corner shim 146 and the downstream corner shim 148, and leakage through the first end 174 and/or the second end 176 may be substantially blocked by increasing the lengths 158, 160, 166, and/or 168.

Figure 5:
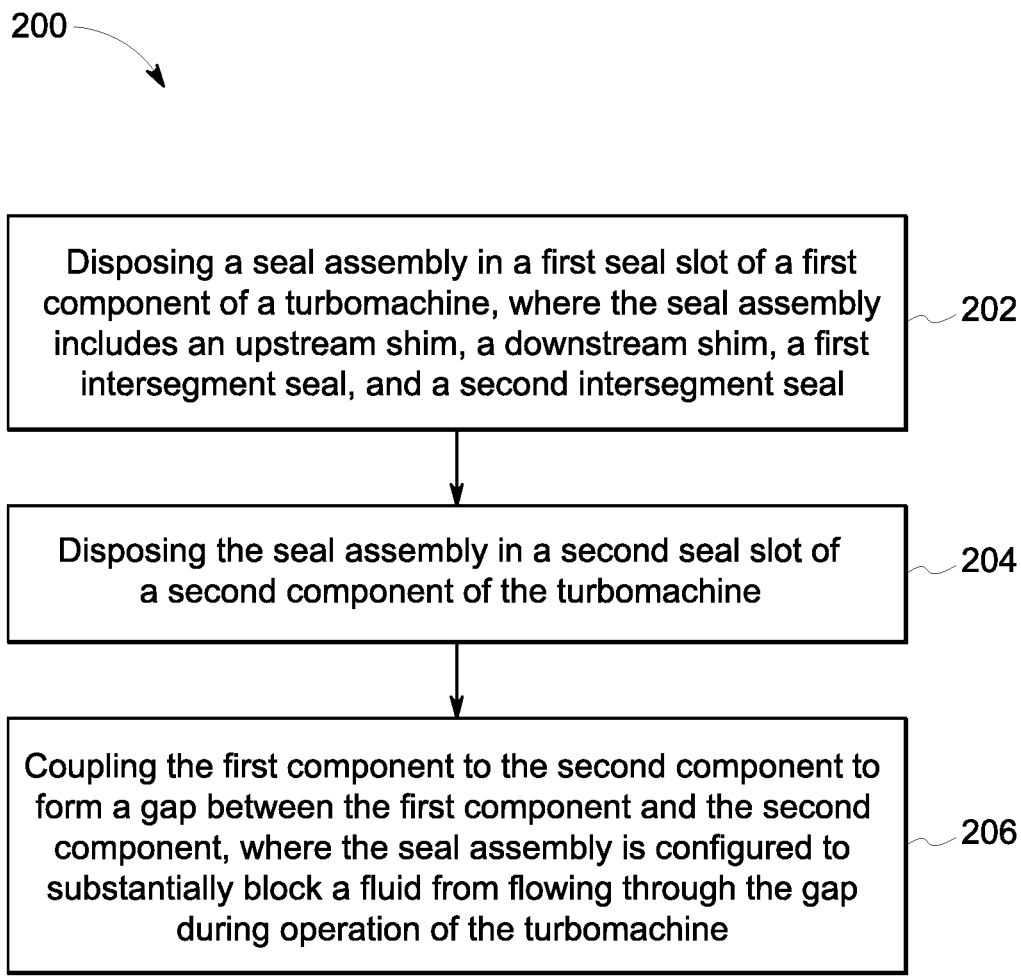
FIG. 5 is a block diagram of a process that may be used to manufacture the turbine of FIG. 3 that includes the seal assembly of FIG. 4, in accordance with an aspect of the present disclosure.

To manufacture the turbine system 10 that includes the seal assembly 56 described in the present disclosure, a process 200 may be performed, as shown in FIG. 5. For example, at block 202, the first portion 57 of the seal assembly 56 may be disposed in the first seal slot 54 of the first component 50. As discussed above, in certain embodiments the seal assembly 56 may include the upstream corner shim 146, the downstream corner shim 148, the first intersegment seal 126, and/or the second intersegment seal 128 when the first seal slot 54 includes the "L" shape (e.g., has a first segment and a second segment joined by a first corner). Although the discussion of FIG. 5 focuses on the seal slot 54 (and the second seal slot 82) having an "L" shape, it should be recognized that the seal assembly 56 may be configured to be disposed in any suitable seal slots 54 and/or 82 to substantially block the fluid from flowing through the gap 84 formed between the first component 50 and the second component 80.

At block 204, the second portion 58 of the seal assembly 56 may be disposed in the second seal slot 82 of the second component 80. Accordingly, at block 206, the first component 50 may be coupled to the second component 80 (e.g., via a fastener such as a screw, a rivet, a clamp, or another securement device). In some embodiments, the steps described in blocks 204 and 206 may occur simultaneously. In other embodiments, the step described in block 206 may occur either before or after the step described in block 204. When the second portion 58 of the seal assembly 56 is disposed in the second seal slot 82, the gap 84 between the first component 50 and the second component 80 may be sealed, such that the fluid flowing between the components 50, 80 is blocked by the seal assembly 56. Moreover, including the upstream corner shim 146 and the downstream corner shim 148 in the seal assembly 56 enhances the seal between the components 50, 80, as the fluid is blocked from flowing through the corner 66 (and/or another corner of the second seal slot 82). Additionally, by disposing the upstream corner shim 146, the downstream corner shim 148, the first intersegment seal 126, and the second intersegment seal 128 in the first and second seal slots 54, 82 as separate components, the first and second intersegment seals 126 and 128 may move within the first seal slot 54 and the second seal slot 82 toward the ends 174, 176 to block the fluid from flowing through the ends 174, 176. Therefore, the seal assembly 56 may provide an enhanced seal between the first and second components 50, 80, thereby enhancing the efficiency of the turbine 18.

Technical effects of the invention include a sealing assembly disposed between components of a turbomachine that may enhance an efficiency of the turbomachine. In accordance with embodiments of the present disclosure, the sealing assembly may include an upstream corner shim, a downstream corner shim, a first intersegment seal, and/or a second intersegment seal as separate components (e.g., not conjoined or coupled to one another). Such a seal assembly may block the fluid from flowing between the components, and specifically, block the fluid from flowing through corners and/or ends of a seal slot configured to receive the seal assembly, which may ultimately enhance an efficiency of the turbomachine This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbomachine comprising:
a first component comprising a first seal slot with a first corner;
a second component coupled to the first component, wherein the second component comprises a second seal slot with a second corner;
a gap between the first component and the second component; and
a seal assembly disposed in the first seal slot, the second seal slot, and the gap, wherein the seal assembly comprises a first corner shim and a second corner shim, the first corner shim and the second corner shim each include two or more members connected by one or more corners and are both configured to fit in the first corner and the second corner, and the first corner shim and the second corner shim in combination with one another are configured to substantially block a fluid from flowing through the gap and through one or both of the first corner and the second corner.

2. The turbomachine of claim 1, wherein the first seal slot comprises a first segment and a second segment coupled to one another by the first corner, and the second seal slot comprises a third segment and a fourth segment coupled to one another by the second corner.

3. The turbomachine of claim 2, wherein the first corner shim and the second corner shim are each configured to be disposed in the first segment, the second segment, the third segment, and the fourth segment to block the fluid from flowing through one or both of the first corner and the second corner.

4. The turbomachine of claim 3, comprising a first intersegment seal and a second intersegment seal, wherein the first intersegment seal and the second intersegment seal are both disposed between the first corner shim and the second corner shim.

5. The turbomachine of claim 4, wherein the first intersegment seal is configured to be disposed in the first portion of the first seal slot and the third portion of the second seal slot, and wherein the second intersegment seal is configured to be disposed in the second portion of the first seal slot and the fourth portion of the second seal slot.

6. The turbomachine of claim 5, wherein the first intersegment seal, the second intersegment seal, the first corner shim, and the second corner shim are not fixedly attached to one another.

7. The turbomachine of claim 6, wherein the first intersegment seal is configured to move toward a first end formed by the first segment of the first seal slot and the third segment of the second seal slot to block the fluid from flowing through the first end, and wherein the second intersegment seal is configured to move toward a second end formed by the second segment of the first seal slot and the fourth segment of the second seal slot to block the fluid from flowing through the second end.

8. The turbomachine of claim 1, wherein the seal assembly comprises an intersegment seal disposed between the first corner shim and the second corner shim.

9. The turbomachine of claim 1, wherein the first corner shim and the second corner shim satisfy manufacturing tolerances such that the first corner shim and the second corner shim are configured to fit in the first seal slot and the second seal slot.

10. The turbomachine of claim 1, wherein the first component is a first stator portion of the turbomachine and the second component is a second stator portion of the turbomachine.

11. A power generation system, comprising:
a turbomachine;
a first component of the turbomachine comprising a first seal slot, wherein the first seal slot comprises a first segment and a second segment coupled to one another by a first corner;
a second component of the turbomachine coupled to the first component, wherein the second component comprises a second seal slot, and wherein the second seal slot comprises a third segment and a fourth segment coupled to one another by a second corner;
a gap between the first component and the second component; and
a seal assembly positioned in the first seal slot, the second seal slot, and the gap, wherein the seal assembly comprises:

a first corner shim positioned in the first segment, the second segment, the third segment, and the fourth segment;

a second corner shim positioned in the first segment, the second segment, the third segment, and the fourth segment;

a first intersegment seal situated between the first corner shim and the second corner shim and positioned in the first segment and the third segment; and a second intersegment seal situated between the first corner shim and the second corner shim and positioned in the second segment and the fourth segment; and wherein each of the first corner shim and the second corner shim include two or more members connected by one or more corners and the seal assembly is configured to block a fluid from flowing through the gap and through one or both of the first corner and the second corner.

12. The power generation system of claim 11, wherein the first intersegment seal, the second intersegment seal, the first corner shim, and the second corner shim are not fixedly attached to one another.

13. The power generation system of claim 12, wherein the first intersegment seal and the second intersegment seal are configured to move between the first corner shim and the second corner shim.

14. The power generation system of claim 13, wherein the first intersegment seal is configured to move toward a first end formed by the first segment and the third segment to block the fluid from flowing through the first end, and wherein the second intersegment seal is configured to move toward a second end formed by the second segment and the fourth segment to block the fluid from flowing through the second end.

15. The power generation system of claim 11, wherein the first intersegment seal comprises a first length shorter than the first segment and the third segment, and wherein the second intersegment seal comprises a second length shorter than the second segment and the fourth segment.

16. The power generation system of claim 11, wherein the first seal slot and the second seal slot are substantially aligned.

17. A method, comprising:
disposing a first portion of a seal assembly in a first seal slot of a first component of a turbomachine, wherein the seal assembly comprises a first corner shim, a second corner shim, a first intersegment seal. and a second intersegment seal, wherein each of the first corner shim and the second corner shim include two or more members connected by one or more corners;

disposing a second portion of the seal assembly in a second seal slot of a second component of the turbomachine; and coupling the first component to the second component to form a gap between the first component and the second component, wherein the seal assembly is configured to substantially block a fluid from flowing through the gap during operation of the turbomachine.

18. The method of claim 17, wherein disposing the first portion of the seal assembly in the first seal slot comprises individually disposing the first corner shim, the second corner shim, the first intersegment seal, and the second intersegment seal into the first seal slot, such that the first corner shim, the second corner shim, the first intersegment seal, and the second intersegment seal are not coupled to one another in the first seal slot.

19. The method of claim 18, comprising individually disposing the first corner shim, the second corner shim, the first intersegment seal, and the second intersegment seal in the second seal slot, such that the first corner shim, the second corner shim, the first intersegment seal, and the second intersegment seal are not coupled to one another in the second seal slot.

20. The method of claim 17, wherein the first intersegment seal and the second intersegment seal are both disposed between the first corner shim and the downstream corner shim.

* * * * *